United States Patent
Angelini et al.

(10) Patent No.: US 9,981,849 B2
(45) Date of Patent: May 29, 2018

(54) ZERO EMISSIONS SULPHUR RECOVERY PROCESS WITH CONCURRENT HYDROGEN PRODUCTION

(71) Applicant: STAMICARBON B.V., Sittard (NL)

(72) Inventors: Fabio Angelini, Rome (IT); Lucia Barbato, Rome (IT)

(73) Assignee: STAMICARBON B.V. ACTING UNDER THE NAME OF MT INNOVATION CENTER, Sittard (NL)

(*) Notice: Subject to any disclaimer, the term of this patent is extended or adjusted under 35 U.S.C. 154(b) by 23 days.

(21) Appl. No.: 14/989,696

(22) Filed: Jan. 6, 2016

(65) Prior Publication Data

US 2016/0115026 A1    Apr. 28, 2016

Related U.S. Application Data

(63) Continuation of application No. 14/115,831, filed as application No. PCT/NL2012/050308 on May 7, 2012, now Pat. No. 9,255,005.

(30) Foreign Application Priority Data

May 6, 2011 (EP) .................................. 11165181

(51) Int. Cl.
   *C01B 17/04* (2006.01)
   *B01D 53/86* (2006.01)
   (Continued)

(52) U.S. Cl.
   CPC ...... *C01B 17/0495* (2013.01); *B01D 53/8612* (2013.01); *B01J 8/00* (2013.01);
   (Continued)

(58) Field of Classification Search
   CPC ............ C01B 17/0495; C01B 17/0426; C01B 17/0408; C01B 17/0404; C01B 3/02;
   (Continued)

(56) References Cited

U.S. PATENT DOCUMENTS 3,647,187 A    3/1972  Dannewitz et al.
4,481,181 A *  11/1984 Norman .................... C01B 3/02
                                                      423/571

(Continued)

FOREIGN PATENT DOCUMENTS

IT         1203898        2/1989
WO    WO-2010/141496    12/2010

OTHER PUBLICATIONS

Hegde et al. "Chemisorption and decomposition of hydrogen sulfide on rhodium(100)" J. Phys. Chem., 1986, 90 (2), pp. 296-300.*

(Continued)

*Primary Examiner* — Anthony J Zimmer
*Assistant Examiner* — Syed Iqbal
(74) *Attorney, Agent, or Firm* — Morrison & Foerster LLP

(57) ABSTRACT

Disclosed is a process for the concurrent production of hydrogen and sulphur from a $H_2S$-containing gas stream, with reduced, and preferably zero, emissions. The method comprises the catalytic oxidative cracking of $H_2S$ so as to form $H_2$ and $S_2$. Preferably, the oxidation is conducted using oxygen-enriched air, preferably pure oxygen. The process is conducted in a reaction chamber comprising a bifunctional catalyst material, so as to favor both the partial oxidation of $H_2S$ and the dissociation thereof.

4 Claims, 2 Drawing Sheets

(51) Int. Cl.
*C01B 3/02* (2006.01)
*C01B 3/04* (2006.01)
*B01J 8/00* (2006.01)

(52) U.S. Cl.
CPC ............. *C01B 3/02* (2013.01); *C01B 3/04* (2013.01); *C01B 17/0404* (2013.01); *C01B 17/0408* (2013.01); *C01B 17/0426* (2013.01); *B01D 2251/102* (2013.01); *B01D 2256/16* (2013.01); *Y02E 60/364* (2013.01); *Y02P 20/129* (2015.11)

(58) Field of Classification Search
CPC .. C01B 3/04; B01J 8/00; Y02P 20/129; Y02E 60/364; B01D 2256/16; B01D 53/8612; B01D 2251/102
See application file for complete search history.

(56) References Cited

U.S. PATENT DOCUMENTS

| | | | |
|---|---|---|---|
| 6,235,259 B1 * | 5/2001 | Ledoux | B01D 53/8615 423/573.1 |
| 6,800,269 B2 * | 10/2004 | Keller | B01D 53/8612 423/576.2 |
| 6,946,111 B2 * | 9/2005 | Keller | B01D 53/8612 423/576.2 |
| 7,560,088 B2 | 7/2009 | Keller et al. | |
| 7,722,705 B2 * | 5/2010 | Gadkaree | B01D 53/02 95/134 |
| 2003/0031607 A1 * | 2/2003 | Streicher | C01B 3/04 422/173 |
| 2005/0180914 A1 * | 8/2005 | Keller | B01D 53/8615 423/576.8 |

OTHER PUBLICATIONS

Clark et al., "Production of H2 from catalytic partial oxidation of H2S in a short-contact-time reactor", Catalysis Communications (2004) 5(12):743-747.

International Search Report for PCT/NL2012/050308, dated Jun. 28, 2012, 3 pages.

* cited by examiner

ZERO EMISSIONS SULPHUR RECOVERY PROCESS WITH CONCURRENT HYDROGEN PRODUCTION

CROSS-REFERENCE TO RELATED APPLICATIONS

This application is a continuation of U.S. application Ser. No. 14/115,831 having an international filing date of 7 May 2012, now allowed, which is the national phase of PCT application PCT/NL2012/050308 having an international filing date of 7 May 2012, which claims benefit of European application No. 11165181.6, filed 6 May 2011. The contents of the above patent applications are incorporated by reference herein in their entirety.

FIELD OF THE INVENTION

The invention pertains to a process for recovering sulphur from a $H_2S$-containing gas stream, and to a sulphur recovery plant. Particularly, the invention pertains to the production of hydrogen associated with a sulphur recovery process.

BACKGROUND OF THE INVENTION

Sulphur Recovery Plants are designed to remove $H_2S$ from $H_2S$-containing acid gases from Amine Regeneration Systems and from Sour Water Strippers producing sulphur, a non toxic product which can be stored and sold in liquid or in solid form to different users for several different industrial applications. The acid gases from Amine Regeneration Systems and Sour Water Strippers, containing a variable amount of $H_2S$, are treated in a Sulphur Recovery Unit (SRU), generally based on the modified Claus process, for bulk sulphur recovery and subsequently in a Tail Gas Treatment (TGT) section for deep sulphur recovery. Other impurities contained in the sour gases, including ammonia and hydrocarbons, are destroyed in the Claus section.

The modified Claus process by itself recovers about 94÷96% (2 catalytic stages) or 95÷98% (3 stages) of the sulphur in the feedstock. A further treatment of the Claus tail gas is therefore necessary when a higher Sulphur Recovery Efficiency (SRE) is required.

The modified Claus process comprises a sub-stoichiometric combustion of the acid gas stream in a thermal reactor (thermal stage) followed by catalytic conversion in the Claus reactors (catalytic stage). In the Claus section one-third of the total $H_2S$ is oxidized to $SO_2$, which reacts with the remaining $H_2S$ to form sulphur and water according to the following reactions:

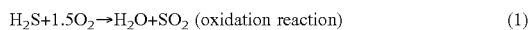
$$H_2S+1.5O_2 \rightarrow H_2O+SO_2 \text{ (oxidation reaction)} \quad (1)$$

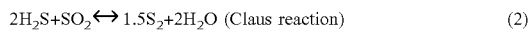
$$2H_2S+SO_2 \leftrightarrow 1.5S_2+2H_2O \text{ (Claus reaction)} \quad (2)$$

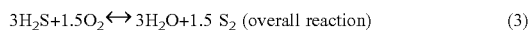
$$3H_2S+1.5O_2 \leftrightarrow 3H_2O+1.5 S_2 \text{ (overall reaction)} \quad (3)$$

The goal of the process is to drive the overall reaction to near completion. In the Claus thermal reactor, the $H_2S$ contained in the acid gas is burnt with air (or with oxygen-enriched air in some specific cases) in a specific burner and only one-third of the total $H_2S$ is oxidized to $SO_2$, while the remaining two-third is not reacted. The total air amount is the one exactly sufficient to oxidize one-third of the total $H_2S$ and to completely oxidize all hydrocarbons and ammonia contained in the feedstock; the molar ratio $H_2S/O_2$ in the feedstock is therefore about 2:1 in order to get a ratio $H_2S/SO_2$ in the Claus tail gas of exactly, or as close as possible to, 2:1, which is the stoichiometric ratio for the Claus reaction, so maximizing Sulphur Recovery Efficiency. During acid gas combustion, a small part of the $H_2S$ (typically 5÷7%) is dissociated to hydrogen and sulphur as per following reaction:

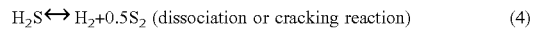
$$H_2S \leftrightarrow H_2+0.5S_2 \text{ (dissociation or cracking reaction)} \quad (4)$$

According to Clark et al., Alberta Sulphur Research Ltd. (ASRL), hydrogen formation also happens according to the following reaction:

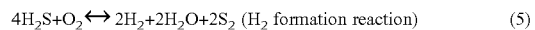
$$4H_2S+O_2 \leftrightarrow 2H_2+2H_2O+2S_2 \text{ ($H_2$ formation reaction)} \quad (5)$$

Several side reactions are also involved, leading to the destruction of ammonia and hydrocarbons and to the formation of carbonyl sulphide COS and carbon disulphide $CS_2$. In order to complete the Claus reactions, a suitable residence time is necessary at high temperature in the thermal reactor.

The Claus thermal reactor is typically followed by a waste heat boiler where furnace effluent is cooled down to about 300° C. and heat is recovered by raising high pressure steam and by a sulphur condenser where process gas is cooled down to sulphur dew point by raising low pressure steam and liquid sulphur is separated.

The Claus thermal stage is generally followed by two or three catalytic stages, each one composed by a gas reheater to bring the gas to the optimal reaction temperature, a catalytic reactor where the Claus reaction takes place and a sulphur condenser where gas is cooled and liquid sulphur is condensed and separated. The Claus reaction is an exothermic equilibrium reaction thermodynamically enhanced by low temperatures. The first Claus catalytic reactor is partly filled with a Claus catalyst (Alumina based) to enhance the Claus reaction and partly filled with a specific high conversion catalyst (Titania based) to enhance the hydrolysis of COS and $CS_2$. The second and third Claus catalytic reactors, if any, are generally filled with Claus catalyst (Alumina based) to enhance Claus reaction.

In order to satisfy the >99% sulphur recovery efficiency normally required for a Sulphur Recovery Plant, the Claus section is generally followed by a Tail Gas Treatment section. Several different alternative processes have been proposed over the years to boost Sulphur Recovery Efficiency, like the SCOT method by Shell Oil Company, the RAR process by TKT, the CBA process by AMOCO, the CLINSULF/DEGSULF method by Linde Actiengesellschaft or the BSR Selectox process by UOP. In the traditional reductive Tail Gas Treatment section, the process gas from a Claus section is preheated and combined with hydrogen from an external source prior to being fed to a hydrogenation reactor, where all sulphur compounds are converted to $H_2S$ over a specific reduction catalyst (Co and Mo oxides based), which performs both the hydrogenation and the hydrolysis functions. The reactor effluent is cooled down in the quench tower by means of circulating steam condensate. The $H_2S$ produced in the hydrogenation reactor is recovered in an amine absorber with a specific amine aqueous solution and recycled to the Claus section from the top of an amine regenerator, where the enriched solution is stripped.

The tail gas from the amine absorber is sent to a thermal incinerator for the oxidation of residual $H_2S$ and other sulphur compounds, such as COS and $CS_2$, to $SO_2$ prior to disposal to the atmosphere via a dedicated stack.

The main drawbacks of traditional Claus Plant are the need for large and expensive equipment against very low sulphur economic value, continuous emissions of $SO_x$ ($SO_2$ and $SO_3$), CO, $CO_2$, $NO_x$ plus traces of $H_2S$ into the atmosphere, and continuous import of hydrogen from the network, for process gas reduction in the TGT section.

In some Plants, where hydrogen is not available, for example in gas fields, the reducing gas mixture is generated in a reducing gas generator by sub-stoichiometric fuel gas combustion. The main drawback of such alternative configuration is the larger equipment size compared to traditional Claus Plant. This is caused by the 10-15% higher process gas flow rate due to large amounts of inerts coming from in-line fuel gas combustion (mainly nitrogen from air and water and carbon dioxide from combustion).

As mentioned in Clark, Catalysis Communications 5 (2004) 743-747, the recovery of $H_2$ from $H_2S$ is a long-standing goal in industry. Clark addresses this by means of the partial oxidation of $H_2S$ over alumina catalysts. Key to this process is said to be the promotion of the reaction of $H_2S$ and $O_2$ under the formation of hydrogen, water, and sulphur at a controlled temperature by means of an external oven. Reduction of emissions into the atmosphere is not addressed.

Some alternative processes have been proposed over the years, which are addressed to thermal or catalytic partial oxidation of $H_2S$.

U.S. Pat. Nos. 6,946,111 and 6,800,269 by Conoco Inc. disclose processes for removing $H_2S$ from a $H_2S$-containing gas stream the first one and from a $H_2S$-rich waste gas stream the second one, comprising a flameless short contact time reactor filled with a suitable catalyst for partial oxidation reaction of $H_2S$ to form sulphur and water, using air or enriched air or pure oxygen with a $H_2S/O_2$ ratio in the feedstock of approximately 2:1, followed by a cooling zone and by a sulphur condenser. The main goal of the first Patent is to desulphurize a gas stream, while the main goal of the second Patent is to propose an alternative solution to the traditional thermal reactor in a Claus Plant. Both Patents are based on hydrogen sulphide catalytic partial oxidation reaction with oxygen to form sulphur and water.

U.S. Pat. No. 7,560,088 by Conoco Phillips Company discloses a process for removing sulphur from a $H_2S$-containing gas stream using a compact system comprising a flameless short contact time catalytic partial oxidation reaction zone followed by a temperature-control zone, a first Claus catalytic reaction zone, a second temperature-control zone, a first liquid sulphur outlet and a first effluent gas outlet. The main goal of this Patent is to propose an alternative solution to traditional Claus Plant based on hydrogen sulphide catalytic partial oxidation to form sulphur and water.

U.S. Pat. No. 4,481,181 by GA Technologies Inc. discloses a process for removing sulphur and recovering hydrogen from a $H_2S$-containing gas stream coupling thermal partial oxidation of $H_2S$ to sulphur and water and thermal dissociation of $H_2S$ to hydrogen and sulphur in the same reaction zone, preceded by feedstock heating section and followed by a cooling zone and by a sulphur condenser, using pure oxygen and a substantial proportion of nitrogen with a $H_2S/O_2$ ratio in the feedstock between 10:1 and 25:1. The main goal of this Patent is to thermally decompose by partial oxidation and dissociation hydrogen sulphide into sulphur and hydrogen.

WO2010/036941 by Chevron U.S.A. Inc. and Drexel University discloses a method for performing $H_2S$ thermal dissociation at temperature below 1600° C. based on H and SH radicals, in one embodiment over a suitable plasma catalyst.

Furthermore, Italian Patent 1 203 898 by Siirtec-Nigi discloses a process called HCR based on the operation of the traditional Claus thermal reactor at a slightly higher $H_2S/O_2$ ratio in the feedstock in order to keep a $H_2S/SO_2$ ratio in the Claus tail gas significantly higher than 2:1. The main goal of this process is to boost hydrogen production in thermal reactor and to avoid hydrogen import in the TGT section. Also with such a process, Sulphur Recovery Plant emissions are not avoided.

From the above discussion, it is evident that several efforts have been made in the past, trying to propose a valid alternative to traditional Claus Plant. In particular, some processes which have been proposed over the years are based on the thermal or catalytic partial oxidation of $H_2S$, while some other processes are focused on the thermal or catalytic cracking of $H_2S$. None of the proposed processes is conceived and arranged to perform $H_2S$ conversion to hydrogen and sulphur over a suitable catalyst able to favor both reactions at the same time.

It would be desired to reduce, and preferably avoid, emissions into the atmosphere. It would also be desired to reduce, and preferably avoid, the importation of hydrogen into the process. Particularly, it would be desired to generate hydrogen, and to optimize the export of hydrogen from the process, yet with concurrent production of sulphur.

SUMMARY OF THE INVENTION

In order to better address one or more of the foregoing desires, the invention presents, in one aspect, a method for the production of hydrogen from a $H_2S$-containing gas stream, comprising subjecting the gas stream to catalytic oxidative cracking so as to form $H_2$ and $S_2$.

In another aspect, the invention provides a plant suitable for conducting the catalytic oxidative cracking of a $H_2S$-containing gas stream, said plant comprising an inlet for a $H_2S$-containing acid gas stream, an inlet for an oxygen-comprising stream, and a Catalytic Oxidative Cracking reaction zone, comprising a catalytic material suitable for $H_2S$ partial oxidation and cracking.

In a still further aspect, the invention relates to a method for the combined production of hydrogen and sulphur from a $H_2S$-containing gas stream, comprising subjecting the gas stream to catalytic oxidative cracking so as to form $H_2$ and $S_2$.

DETAILED DESCRIPTION OF THE INVENTION

Figure 1:
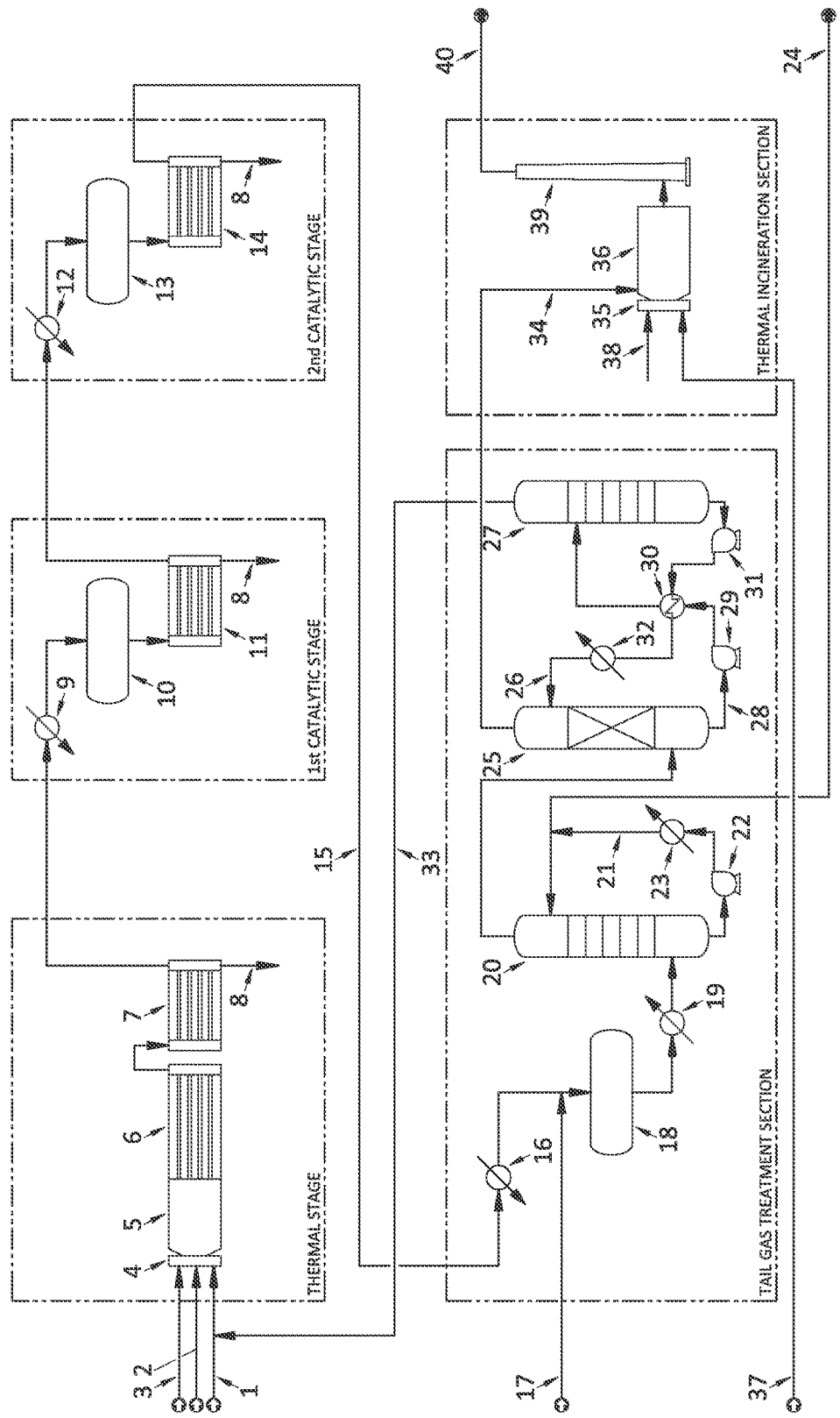
FIG. 1 depicts a simplified flow scheme of a typical traditional Claus Plant comprising a thermal stage, two catalytic stages, a subsequent reductive Tail Gas Treatment section, and a thermal incineration section.

In a broad sense, the invention is based on the simultaneous occurrence of cracking and partial oxidation of $H_2S$ so as to provide concurrent production of sulphur and of a significant amount of hydrogen. This serves to address the problem of gas emissions into the atmosphere and producing at the same time a valuable hydrogen export stream.

It is emphasized that the catalytic oxidative cracking in accordance with the invention is a fundamentally different process from both the thermal stage and the catalytic stage in an existing Claus-type process. With reference to the reaction equations (1) to (5) mentioned above, the Claus processes are directed to driving the above reaction (3) to near completion. The present invention is based on the judicious insight to provide a process based on the side reactions (4) and (5), and to promote these reactions for the production, from a $H_2S$-containing gas-stream, of both hydrogen and sulphur.

The process of the invention is also fundamentally different from the recent proposals by Clark et al. The references authored by the latter, are based on a theory of direct oxidation of $H_2S$ under the formation of hydrogen, water and sulphur. The resulting conversion, whilst avoiding the formation of $SO_2$, is subject to improvement as to the conversion of $H_2S$ and the production of sulphur concurrently with $H_2$.

In the present invention a Catalytic Oxidative Cracking (COC) stage substitutes the Claus thermal stage. The process of the invention thus favors $H_2S$ dissociation and partial oxidation instead of complete oxidation and Claus reaction.

The catalytic oxidative cracking is conducted in one or more reaction zones, preferably provided in one reaction chamber. Throughout the text the term "chamber" may relate to one or more reaction zones.

The invention presents the skilled person with the insight to promote the above-mentioned reactions (4) and (5). The fact that thereto the gas stream is to be subjected to catalytic oxidative cracking, implies a clear message to the skilled person as to how to carry this out.

It will be understood that the reaction zone wherein the Catalytic Oxidative Cracking takes place, comprises one or more catalysts suitable for both $H_2S$ partial oxidation and cracking. This can be a single catalyst that serves to favor both reactions. Accordingly, the catalyst is preferably selected from the group consisting of Pt, Rh, Ru, Ir, Pd, Co, Mo, Ni, Fe, W, Cu, Cd, the corresponding sulphides, the corresponding oxides, and combinations of the foregoing. The catalyst preferably includes a support comprising oxides, such as Alumina, Zirconia, Lantanium oxide, or one or more combinations of these materials.

In one interesting embodiment, the Catalytic Oxidative Cracking stage is divided into two steps in series, wherein the first serves to favor partial oxidation of $H_2S$ and the second favors $H_2S$ cracking. It will be understood that also a plurality of oxidation stages, followed by a plurality of cracking stages, can be employed.

In such an embodiment, the partial oxidation catalyst is preferably selected from the group consisting of one or more active components selected from Group VIII metals as such (e.g. Pt, Rh, Ir, Ru, Pd, Ni, Co, Mn, Zn, Cu) and the oxides thereof, and the cracking catalyst is preferably selected from the group consisting of metal sulphides, such as $CoS_2$, NiS, $NiS_2$, $WS_2$, $MoS_2$, $FeS_2$, $Ag_2S$, CuS, CdS, MnS, ZnS, $Cr_2S_3$.

In general, the catalysts will be provided, in a conventional manner, on a catalyst bed over which the gas stream to be treated is led. In the aforementioned embodiment wherein two catalytic steps are conducted in series, the first is provided as a short contact time catalytic bed, filled with suitable catalyst for $H_2S$ partial oxidation, and the second bed is of a higher volume and filled with a suitable catalyst mainly designed for $H_2S$ cracking. The choice of the types of beds and volumes thereof are well within the ambit of the skilled person's normal capabilities.

The Catalytic Oxidative Cracking reaction zone or zones are provided with oxygen. The oxygen is preferably provided as a gas enriched with oxygen as compared to air. Preferably, this is an oxygen-containing gas-stream comprising at least 40 vol. % oxygen, preferably at least 60 vol. % oxygen. More preferably, this oxygen is provided as substantially pure oxygen, viz. 90 vol. %-99 vol. % of oxygen, or as close to 100% as available.

The use of oxygen-enriched gas, and preferably pure oxygen, is not only related to optimizing the catalytic oxidative cracking process, it also presents advantages such as the avoidance of an unnecessarily large equipment, which would be needed on account of the presence of large volumes of inert (nitrogen) gas. Moreover, with reference to the invention's purpose to produce hydrogen, in addition to sulphur recovery and with reduced emissions, it will be advantageous to reduce, and preferably avoid, the presence of nitrogen in the tail gas of the process.

The quantity of oxygen fed to the reactor is selected so as to achieve a ratio $H_2S/O_2$ in the feedstock higher than typical figure of about 2:1. Preferably, $H_2S/O_2$ ratio in the feedstock should be in the range 2:1-6:1, more preferably in the range 3:1-5:1, still more preferably in the range 4:1-4.5:1.

In the preferred embodiment of operating the catalytic oxidative cracking on the basis of a ratio $H_2S/O_2$ between 4:1 and 4.5:1, most preferred between 4.1:1 and 4.5:1, preferred reaction temperatures to obtain simultaneously cracking and partial oxidation of $H_2S$ are in the range 900° C.-1500° C., preferably in the range of 900° C. -1200° C. More preferably a temperature of about 1000° C. is obtained.

In one embodiment, the feedstock to Catalytic Oxidative Cracking reaction zone or zones ($H_2S$-containing acid gas and oxygen-containing gas) is preheated in order to increase the reaction temperature, to boost hydrogen production and to depress $SO_2$ formation.

In one embodiment of the present invention, the $H_2S$-containing acid gas and the oxygen-containing gas are mixed in a static mixer just before entering the catalytic bed of the Catalytic Oxidative Cracking reaction zone or zones.

In one embodiment the hydrogen concentration in the effluent of the reaction chamber (after quenching) is at least 3 vol %, preferably at least 5 vol % most preferred at least 7 vol %.

It should be noted that the reaction preferably is conducted autothermally. This refers to the fact that, whilst the process is preferably adiabatic, heat exchange takes in fact place, since the oxidation reaction is exothermal, and the cracking reaction is endothermal, whereby heat made available through the exothermal reaction is utilized in the endothermal reaction.

All in all, the process of the invention is believed to favor reactions (4) and (5) relative to reactions (1) and (2), leading to lower $H_2S$ conversion, but on the other hand to significantly higher $H_2$ formation and to much lower $SO_2$ formation. As a consequence of the lower $H_2S$ conversion, a higher acid gas recycle rate from $H_2S$-containing gas source (e.g. an amine regenerator) to reaction chamber is obtained as compared to a traditional Claus Plant.

The catalytic oxidative cracking process of the invention serves to reduce the temperature so as to provide the required reaction equilibrium. This results in increasing the hydrogen yield and minimizing $SO_2$ formation, which in turn serves to minimize hydrogen consumption in the Tail Gas Treatment section to reduce $SO_2$ to $H_2S$.

Preferably, the reaction zone is separately fed with $H_2S$-containing acid gas and the oxygen-containing gas, and these gases are mixed prior to entering the catalytic bed.

The gas effluent from the reaction chamber is preferably quenched so as to avoid recombination of $H_2$ and $S_2$ to form $H_2S$, viz. by the inverse reaction of (4), which would make the process sub-optimal in terms of overall conversion. Preferably this quenching is done substantially instantaneously. The quenching is preferably to a temperature lower than 950° C., preferably in the range 850÷750° C. The residence time in the quench zone is preferably as short as possible, typically of from 10 ms to 300 ms, preferably from 10 ms to 100 ms, more preferably from 10 ms to 50 ms.

The quench zone (which preferably is a zone of the reaction chamber) is preferably followed by a waste heat boiler and a sulphur condenser to cool down the process gas and to recover liquid sulphur. The latter is preferably done by raising high pressure steam in the waste heat boiler and low pressure steam in the sulphur condenser.

In a preferred embodiment, the quenching of the gas effluent from the reaction chamber is achieved by mixing with water in the final part of the reaction chamber. In a most preferred embodiment, the mixing of the gas with water is performed with a water sprayer in a suitable mixing chamber just below the catalytic bed.

Although the process of the invention substantially reduces the formation of $SO_2$, it will be inevitable that some $SO_2$ is formed. In order to remove such $SO_2$, the Catalytic Oxidative Cracking stage is preferably followed by a Tail Gas Treatment section. Therein a part (e.g. about 10-15 vol. %) of the produced hydrogen is consumed in order to reduce residual $SO_2$ to $H_2S$ in a hydrogenation reactor. Due to the much higher hydrogen content and to the much lower $SO_2$ content in the tail gas compared to traditional Claus Plant, the reduction step of the Tail Gas Treatment section can be performed without any hydrogen import.

The tail gas is preferably preheated and fed to a hydrogenation reactor. Therein the $SO_2$, as well as other residual sulphur compounds, such as COS and $CS_2$, are converted into $H_2S$, which is then removed. This removal can be done in a conventional manner, e.g., by scrubbing the gas with a lean amine solution in an absorber.

In one embodiment, the Catalytic Oxidative Cracking stage is followed by one Claus catalytic stage, comprising a gas reheater, a Claus catalytic reactor and sulphur condenser, in order to convert most of the $SO_2$ into sulphur, thereby minimizing $H_2$ consumption for $SO_2$ reduction in the Tail Gas Treatment section.

In one embodiment, the hydrogen stream obtained from the TGT absorber is sent to end users, like hydrotreaters, hydrocrackers or hydrodesulphurizers. It should be noted that the composition of the hydrogen rich stream from the top of the TGT absorber may be different depending on variables such as SRU feedstock quality, plant configuration and operating conditions, and may include traces or percentages of $H_2O$, $N_2$, CO, $CO_2$, $H_2S$, COS and $CS_2$.

In a preferred embodiment, a hydrogen stream obtained from the TGT absorber is further purified in a Hydrogen Purification section (for example a Pressure Swing Absorber). It should be noted that, prior to purification, the composition of a hydrogen rich stream from the top of the TGT absorber may be different depending on variables such as SRU feedstock quality, plant configuration and operating conditions, and may include traces or percentages of $H_2O$, $N_2$, CO, $CO_2$, $H_2S$, COS and $CS_2$.

The purified hydrogen is sent to end users, like hydrotreaters, hydrocrackers or hydrodesulphurizers.

The invention, in one aspect, also relates to a plant suitable for conducting the catalytic oxidative cracking of a $H_2S$-containing gas stream, said plant comprising an inlet for a $H_2S$-containing acid gas stream, an inlet for an oxygen-comprising stream, and a Catalytic Oxidative Cracking reaction zone, comprising a catalytic material suitable for $H_2S$ partial oxidation and cracking. Preferably, the plant further comprises a gas quench zone.

In one embodiment, the catalytic material comprises a single catalytic bed comprising a catalyst that is bifunctional in the sense that it serves to catalyze both the partial oxidation of $H_2S$ and the cracking. In another embodiment, the catalytic material comprises at least two catalytic beds, one provided with a catalyst composition that favors partial oxidation of $H_2S$, the other with a catalyst composition that favors cracking of $H_2S$. The catalyst compositions in the catalytic material are preferably as described above.

In one embodiment, the Catalytic Oxidative Cracking reaction chamber is refractory lined in order to withstand temperatures up to 1500° C.

In one embodiment, the Catalytic Oxidative Cracking reaction chamber is vertically mounted above the quench zone to facilitate the installation of the catalytic bed or beds.

The invention will be illustrated with reference to the following, non-limiting Examples and the accompanying non-limiting Figures.

Detailed Description Of The Figures

Looking at FIG. 1, in a traditional Claus Plant, acid gas from one or more Amine Regeneration Unit(s) 1 is fed together with acid gas from Sour Water Stripper Unit(s) 2 and with a combustion air stream 3 to a thermal reactor burner (or Claus main burner) 4, directly connected to a thermal reactor (or reaction furnace) 5, where one third of $H_2S$ is converted to $SO_2$ and all other compounds such as hydrocarbons and ammonia are completely oxidized. The furnace effluent, after an adequate residence time in the thermal reactor, is cooled down in a Claus waste heat boiler 6, where heat is recovered generating high pressure steam. The process gas from the Claus waste heat boiler is fed to a first sulphur condenser 7, where gas is cooled generating low pressure steam and sulphur 8 is condensed and is sent to degassing and storage. The process gas from the first sulphur condenser is preheated in a first Claus reheater 9 before entering a first Claus catalytic reactor 10, where the reaction between $H_2S$ and $SO_2$ to produce sulphur vapors continues until equilibrium. The process gas from reactor 10 is sent to a second sulphur condenser 11, where gas is cooled generating low pressure steam and sulphur 8 formed in the reactor is condensed and is sent to degassing and storage. The process gas from the second sulphur condenser is preheated in a second Claus reheater 12 before entering a second Claus catalytic reactor 13, where the reaction between the $H_2S$ and $SO_2$ to sulphur vapours continues until equilibrium. The process gas from reactor 13 is fed to a third sulphur condenser 14, where gas is cooled generating low pressure steam (generally 4.5-6 barg), or or low low pressure steam (generally about 1.2 barg) and sulphur 8 formed in the reactor is condensed and is sent to degassing and storage. Claus tail gas 15 from third sulphur condenser is sent to Tail Gas Treatment section.

Figure 2:
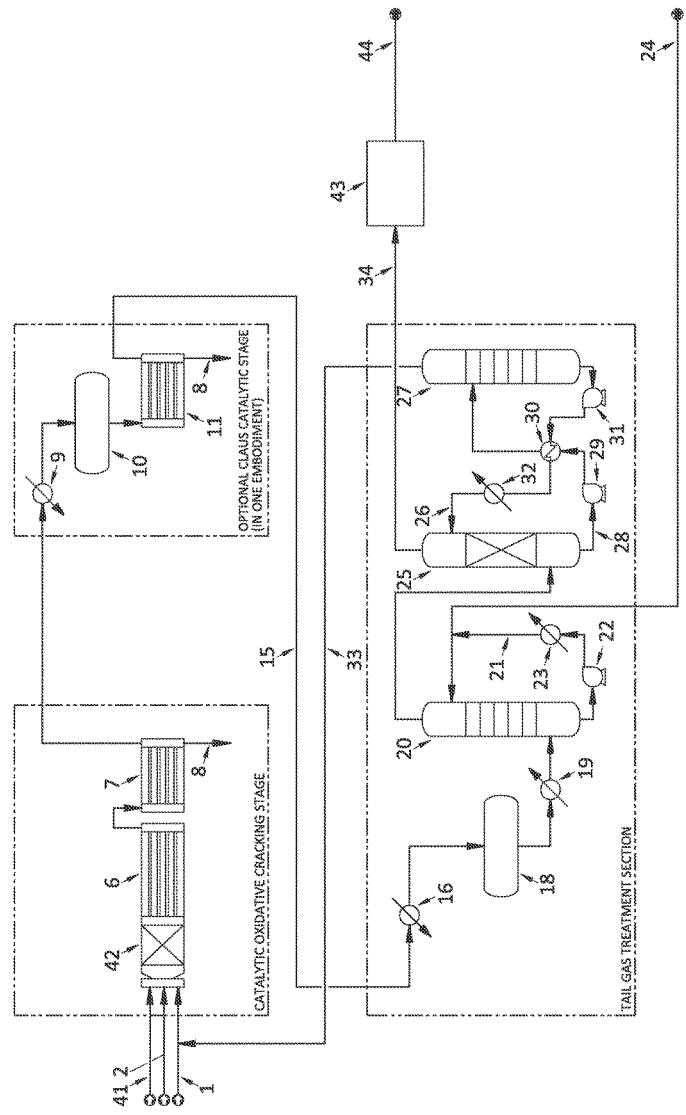
FIG. 2 presents a simplified flow scheme of an $H_2S$ Catalytic Oxidative Cracking Plant according to the invention, comprising a catalytic oxidative cracking stage, optionally a Claus catalytic stage, and a subsequent reductive Tail Gas Treatment section.

Looking at FIG. 2, in a $H_2S$ Catalytic Oxidative Cracking Plant according to the invention, acid gas from one or more Amine Regeneration Unit(s) 1 is fed together with acid gas from one or more Sour Water Stripper Unit(s) 2 and with a pure oxygen stream 41 (or an oxygen-enriched air stream) to a Catalytic Oxidative Cracking reaction chamber 42, where $H_2S$ is partially oxidized to $S_2$ and partially dissociated into $H_2$ and $S_2$ over a suitable catalyst, while all other compounds such as hydrocarbons and ammonia are completely oxidized and only a very small amount of $SO_2$ is formed. The reactor effluent is cooled down in a waste heat boiler 6, where heat is recovered generating high pressure steam. The process gas from the waste heat boiler is fed to a sulphur condenser 7, where gas is cooled generating low low pressure steam and sulphur 8 is condensed and is sent to degassing and storage; tail gas 15 from sulphur condenser is sent to a Tail Gas Treatment section.

In one embodiment, the process gas from the waste heat boiler 6 is fed to a first sulphur condenser 7, where gas is cooled generating low pressure steam and sulphur 8 is condensed and is sent to degassing and storage. The process gas from the first sulphur condenser is preheated in the first Claus reheater 9 before entering a first Claus catalytic reactor 10, where the reaction between $H_2S$ and $SO_2$ to produce sulphur vapors continues until equilibrium, so removing almost all $SO_2$. The process gas from reactor 10 is sent to a second sulphur condenser 11, where gas is cooled generating low low pressure steam and sulphur 8 formed in the reactor is condensed and is sent to the degassing and storage. Tail gas 15 from the second sulphur condenser (or from the first sulphur condenser in the first embodiment) is sent to a Tail Gas Treatment section.

In both Plant configurations shown in FIG. 1 and FIG. 2, and also in the embodiment of the present invention comprising a further Claus catalytic step, tail gas 15 from final sulphur condenser is first preheated in the tail gas preheater 16. In the traditional Claus Plant, as shown in FIG. 1, tail gas is mixed as necessary with hydrogen obtained from an external network 17, while in the novel $H_2S$ Catalytic Oxidative Cracking Plant according to the invention, as shown in FIG. 2, separate import of hydrogen is not necessary, and tail gas is directly sent to a hydrogenation reactor 18. In the hydrogenation reactor (or reduction reactor) all sulphur compounds contained in the process gas are converted to $H_2S$ under slight hydrogen excess. The tail gas leaving the reactor is cooled down first in a TGT waste heat boiler 19 generating low pressure steam and then in a quench tower 20, where the process gas cooling is achieved by circulation of the condensate 21 generated in the gas cooling. Quench water pumps 22 provide water circulation to the tower, while heat is removed from the system by a quench water cooler 23. The excess sour water 24 generated in the gas cooling is sent to battery limits for treatment in the Sour Water Stripper (SWS) Unit. The cooled tail gas from the quench tower is fed to the absorber 25. The absorption of the $H_2S$ contained in the tail gas is accomplished using a selective lean amine solution 26 coming from an amine regenerator 27. The rich amine solution 28 from the bottom of the absorber is pumped by means of the rich amine pumps 29 to a lean/rich amine heat exchanger 30, where the rich amine is preheated using as heating medium the hot lean amine from the bottom of the amine regenerator prior of being fed to amine regenerator 27 itself. The lean amine from the bottom of the amine regenerator is pumped by means of the lean amine pumps 31, is first cooled in the lean/rich amine heat exchanger 30 and then in the lean amine cooler 32 prior of being fed to the absorber 25. The acid gas 33 from the top of regenerator is recycled back to the Claus thermal reactor burner 4 in the traditional Claus Plant (FIG. 1), while it is recycled to Catalytic Oxidative Cracking reaction chamber 42 in the novel $H_2S$ Catalytic Oxidative Cracking Plant of the invention (FIG. 2).

In the traditional Claus Plant (FIG. 1), the tail gas from the absorber 34 is sent to an incinerator burner 35, directly connected to an incinerator 36, where all residual sulphur compounds are oxidized to $SO_2$. The combustion of the tail gas is supported with fuel gas combustion, therefore a fuel gas stream 37 and a combustion air stream 38 are also fed to the incinerator burner. The incinerator effluent (or flue gas) 40, after an adequate residence time in the thermal incinerator, is discharged into the atmosphere via a dedicated stack 39. In the novel $H_2S$ Catalytic Oxidative Cracking Plant (FIG. 2), the hydrogen rich stream from absorber 34 is sent to users outside the Sulphur Recovery Unit.

In a preferred embodiment, the hydrogen rich stream from the absorber, containing some amount of impurities such as $N_2$, $CO_2$, $H_2S$, COS and $CS_2$, is sent to a further Hydrogen Treatment section 43, where it is further purified. A substantially pure hydrogen stream 44 from Hydrogen Treatment section is finally sent to different end-users.

EXAMPLE 1

A Sulphur Recovery Unit with nominal capacity of about 500 t/d sulphur production is fed with an amine acid gas rich in $H_2S$. In this example, a traditional Claus Plant and the novel $H_2S$ Catalytic Oxidative Cracking Plant are compared.

In the traditional Claus Plant, amine acid gas is fed, with combustion air preheated at 220° C., to a thermal reactor burner, connected to a thermal reactor and followed by a waste heat boiler and a first sulphur condenser (thermal stage). The thermal stage is followed by two catalytic stages and by reductive Tail Gas Treatment section, where Claus tail gas is added with hydrogen, reduced in the hydrogenation reactor, cooled and scrubbed by means of a lean amine solution. The acid gas from the top of the amine regenerator is recycled to the Claus thermal reactor, while the tail gas from the top of the absorber is sent to the thermal incinerator where it is oxidized prior to being discharged into the atmosphere via a dedicated stack.

In an $H_2S$ Catalytic Oxidative Cracking Plant according to the invention, amine acid gas is preheated at 240° C. and is sent, together with pure oxygen also preheated at 240° C., to a catalytic oxidative cracking reaction chamber, followed by a quench zone, waste heat boiler and sulphur condenser. The tail gas from sulphur condenser is fed to a reductive Tail Gas Treatment section, where it is reduced in the hydrogenation reactor (by means of hydrogen produced in the Catalytic Oxidative Cracking stage), cooled and scrubbed by means of a lean amine solution. The acid gas from the top of the regenerator is recycled to the Catalytic Oxidative Cracking reaction chamber, while the hydrogen rich stream from the top of the absorber is sent to battery limit.

Table 1 below shows the main operating parameters for the traditional Claus Plant and for the novel $H_2S$ Catalytic Oxidative Cracking (COC) Plant. From the analysis of the table, it is possible to see the much higher acid gas recycle flow rate (10 times more than traditional Claus Plant), the much lower absorber effluent flow rate (8 times less) and the much higher hydrogen concentration (25 times more) in this gas.

TABLE 1

| | | Claus Plant | COC Plant |
|---|---|---|---|
| acid gas from unit battery limit | kmol/h | 750 | 750 |
| acid gas recycle from amine regenerator | kmol/h | 50 | 555 |

TABLE 1-continued

|  |  | Claus Plant | COC Plant |
|---|---|---|---|
| air/oxygen to reaction furnace/chamber | kmol/h | 1677 (19% $O_2$) | 261 (100% $O_2$) |
| $H_2S/O_2$ ratio in the feedstock | mol/mol | 1.9 | 4.4 |
| reaction furnace/chamber pressure | barg | 0.66 | 0.66 |
| reaction furnace/chamber temperature | ° C. | 1310 | 1130/750 (*) |

Table 2 below shows the main operating parameters for the novel $H_2S$ Catalytic Oxidative Cracking (COC) Plant in two different embodiments, without and with Claus catalytic stage downstream of the Catalytic Oxidative Cracking stage. From the analysis of the table, it is possible to see the slightly lower acid gas recycle flow rate in the embodiment with one Claus catalytic stage (10% less than embodiment without Claus catalytic stage), the slightly higher hydrogen rich stream flow rate (15% more).

TABLE 2

|  |  | COC Plant of the invention | COC Plant of the invention with Claus catalytic stage |
|---|---|---|---|
| acid gas from unit battery limit | kmol/h | 750 | 750 |
| acid gas recycle from amine regenerator | kmol/h | 555 | 498 |
| Oxygen to reaction chamber | kmol/h | 261 | 250 |
| $H_2S/O_2$ ratio in the feedstock | Mol/mol | 4.4 | 4.4 |
| reaction chamber pressure | barg | 0.66 | 0.66 |
| reaction chamber temperature | ° C. | 1130/750 (*) | 1130/750 (*) |
| reaction chamber effluent | kmol/h | 2220 | 2124 |
| reaction chamber effluent composition |  |  |  |
| $H_2$ | % vol. | 7.93 (*) | 7.89 (*) |
| $S_2$ | % vol. | 14.40 (*) | 14.34 (*) |
| $H_2S$ | % vol. | 21.71 (*) | 21.74 (*) |
| $SO_2$ | % vol. | 0.48 (*) | 0.51 (*) |
| $COS + CS_2$ | % vol. | 0.04 (*) | 0.04 (*) |
| other components ($N_2$, CO, $CO_2$, $H_2O$) | % vol. | 55.44 (*) | 55.48 (*) |
| sulphur product | t/d | 502 | 502 |
| hydrogen rich stream | kmol/h | 196 | 224 |
| hydrogen rich stream composition |  |  |  |
| $H_2$ | % vol. | 77.33 | 79.01 |
| other components | % vol. | 22.67 | 20.99 |

(*) Quench zone outlet

TABLE 1-continued

|  |  | Claus Plant | COC Plant |
|---|---|---|---|
| reaction furnace/chamber effluent | kmol/h | 2657 | 2220 |
| reaction furnace/chamber effluent composition |  |  |  |
| $H_2$ | % vol. | 1.55 | 7.93 (*) |
| $S_2$ | % vol. | 8.60 | 14.40 (*) |
| $H_2S$ | % vol. | 5.53 | 21.71 (*) |
| $SO_2$ | % vol. | 2.89 | 0.48 (*) |
| $COS + CS_2$ | % vol. | 0.25 | 0.04 (*) |
| other components ($N_2$, CO, $CO_2$, $H_2O$) | % vol. | 81.18 | 55.44 (*) |
| sulphur product | t/d | 502 | 502 |
| absorber effluent/hydrogen rich stream | kmol/h | 1546 | 196 |
| absorber effluent/$H_2$ rich stream composition |  |  |  |
| $H_2$ | % vol. | 3.08 | 77.33 |
| other components | % vol. | 96.92 | 22.67 |

(*) Quench zone outlet

EXAMPLE 2

This example provides a comparison of two embodiments of the novel Catalytic Oxidative Cracking Plant for the same Plant as used in Example 1.

In the first embodiment, the Catalytic Oxidative Cracking stage is followed by a Tail Gas Treatment section. In the second embodiment, the Catalytic Oxidative Cracking stage is followed by a Claus catalytic stage and thereafter by a Tail Gas Treatment section.

The invention claimed is:

1. A plant suitable for conducting catalytic oxidative cracking of an $H_2S$-containing gas stream, said plant comprising a catalytic reaction chamber having a first inlet for an $H_2S$-containing acid gas stream and a second inlet for an oxygen-comprising stream and comprising a reaction zone containing in series a first catalyst bed filled with a first catalyst for $H_2S$ partial oxidation and downstream thereof a second catalyst bed filled with a second catalyst for $H_2S$ cracking;
   wherein the first catalyst is an oxidation catalyst selected from the group consisting of one or more Group VIII metals and oxides thereof and the second catalyst is a cracking catalyst which is one or more metal sulphides; and
   wherein the reaction chamber further comprises a gas quench zone downstream from the reaction zone; and
   wherein said plant further comprises, upstream of said catalytic beds, a static mixer configured for mixing gases from said first and second inlets.

2. A plant according to claim 1, wherein said gas quench zone comprises a water sprayer.

3. The plant according to claim 1, wherein the second catalyst is selected from the group consisting of $CoS_2$, NiS, $NiS_2$, $WS_2$, $MoS_2$, $FeS_2$, $Ag_2S$, CuS, CdS, MnS, ZnS, and $Cr_2S_3$.

4. The plant according to claim 1 which further comprises a waste heat boiler and a sulphur condenser downstream of the reaction chamber.

* * * * *